Dec. 16, 1930. F. WELS 1,785,467
PLEASURE SLED OR SLEIGH
Filed Dec. 3, 1929

F. Wels INVENTOR
By: Marks & Clerk
Attys.

Patented Dec. 16, 1930

1,785,467

UNITED STATES PATENT OFFICE

FRANZ WELS, OF SCHLOSS HARTA, NEAR HOHENELBE, CZECHOSLOVAKIA, ASSIGNOR OF ONE-HALF TO CHRISTIAN KRONIG, OF SCHLOSS HARTA, NEAR HOHENELBE, CZECHOSLOVAKIA

PLEASURE SLED OR SLEIGH

Application filed December 3, 1929, Serial No. 411,359, and in Austria November 29, 1928.

This invention relates to a sled, sleigh or small car driven by a movement similar to that of the fish tail.

One mode of carrying out the present invention is illustrated by way of example on the accompanying sheet of drawings in which:—

Figure 1:
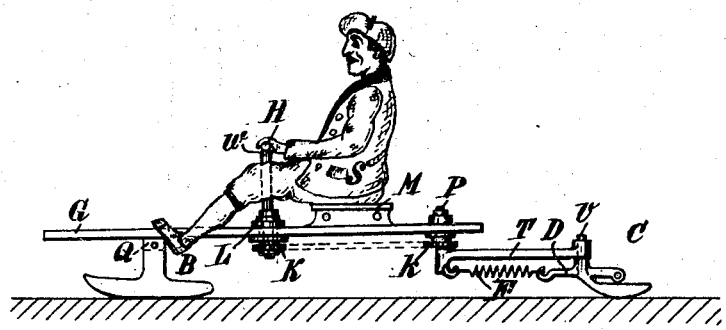
Figs. 1 and 2 illustrate a pleasure sled in elevation and plan view respectively.
Figure 2:
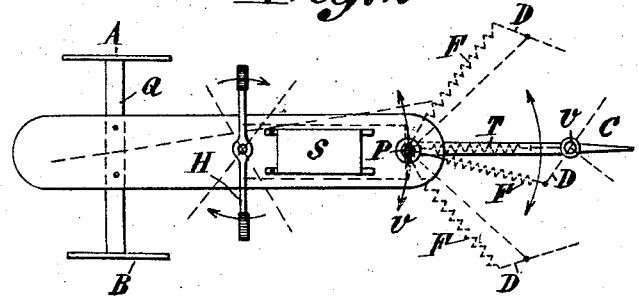
Figure 3:
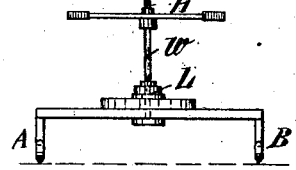
Fig. 3 is a front elevation of the invention, parts being removed.
Figure 4:
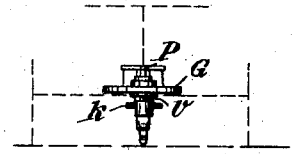
Fig. 4 is a rear elevation thereof.
Figure 5:
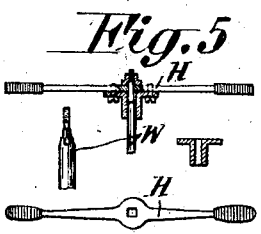
Fig. 5 is a detail of the assembly and parts of the tiller.
Figure 6:
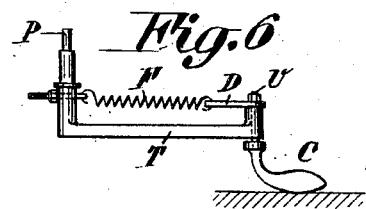
Fig. 6 is an enlarged detail side view of the driving member.

An important factor in the direct progressive propulsion of a vehicle running on the ground is the correct location of the three points A, B and C with respect to the centre of gravity S.

The vehicle is driven or operated by a double armed tiller H. The pillar $w$ of the latter is mounted to rotate in a vertical sleeve L and at its bottom end is provided with a chain wheel K, the movement of the same being transmitted rearwardly to a chain wheel $k$ of a like or smaller size by means of a sprocket chain.

The chain wheel $k$ is keyed to a short shaft P, which is arranged in a gun metal bearing and carries a rearwardly extending rocking lever T, provided at its rear end with the proper driving member C. The latter is rotatably mounted in a vertical bearing $v$ and operates in the following manner:—

The rigid arm D of the driving member C is connected with the shaft P by means of a spring F and thus is normally held in alignment with the lever T. The driving member C, resting on the ground, particularly in view of the weight of the occupant S, and extending rearwardly from the arm D, is turned or rocked about its pivot and turned to different angular positions with respect to the rocking lever T. The extent of angular displacement of the member C depends of course on the intensity of the rocking force and on the tension of the spring.

It is evident that the pivot P, disposed between the points A, B and C is subjected to small rocking movement at the beginning of the strokes. However, owing to the inertia of the mass S and the rapid succession of the impulses, the angular positions assumed by the driving member C in contact with the road surface during oscillation of the lever T produces a pushing or propelling effect resulting in forward movement of the sled. Of course the member C and the lever T serve as rudder when they are turned to proper position and held stationary against lateral movement.

The vehicle is provided with a board G, fitted with a raised seat M, and with a footrest Q.

I claim:

1. In a pleasure sled the provision of a rocking lever pivoted to the sled, a resiliently movable driving member rotatably attached to the free end of said lever, and means connected with said lever for rocking the same and operating said driving member.

2. In a pleasure sled the provision of a rocking lever pivoted to the sled, a resiliently movable rearwardly extending driving member rotatably attached to the free end of said lever, and means connected with said lever for rocking the same and operating said driving member.

3. In a pleasure sled the provision of a rocking lever pivoted to the sled, a resiliently movable driving member rotatably attached to the free end of said lever, a tiller and a gear connecting the latter with said lever for rocking the same and operating said driving member.

4. In a pleasure sled the provision of a rocking lever pivoted to the sled, a resiliently movable rearwardly extending driving member rotatably attached to the free end of said lever, a tiller and a gear connecting the latter with said lever for rocking the same and operating said driving member.

5. In a pleasure sled the provision of a rocking lever pivoted to the sled, a resiliently movable driving member rotatably attached to the free end of said lever, a tiller and a gear connecting the latter with said lever for rocking the same and operating said driving member, and means for tightening and securing the tiller in position.

6. In a pleasure sled the provision of a rocking lever pivoted to the sled, a resiliently movable rearwardly extending driving member rotatably attached to the free end of said lever, a tiller and a gear connecting the latter with said lever for rocking the same and operating said driving member, and means for tightening and securing the tiller in position.

In testimony whereof I affix my signature.

FRANZ WELS.